Nov. 3, 1970 — MASAHIKO INOUE ET AL — 3,537,751

SEAT CONSTRUCTION

Filed Aug. 2, 1968 — 2 Sheets-Sheet 1

Masahiko Inoue
Katsu Sakurai
INVENTORS

BY Henry B. Anspach
Attorney

Nov. 3, 1970   MASAHIKO INOUE ET AL   3,537,751
SEAT CONSTRUCTION

Filed Aug. 2, 1968                         2 Sheets-Sheet 2

Masahiko Inoue
Katsuo Sakurai
INVENTORS
BY George B. Oujevolk
Attorney

United States Patent Office 3,537,751
Patented Nov. 3, 1970

3,537,751
SEAT CONSTRUCTION
Masahiko Inoue and Katsuo Sakurai, Toyota-shi, Japan, assignors to Messrs. Toyota Jidosha Kogyo Kabushiki Kaisha, Toyota-shi, Japan
Filed Aug. 2, 1968, Ser. No. 749,796
Claims priority, application Japan, Aug. 26, 1967, 42/54,521
Int. Cl. A47c 7/20, 7/14
U.S. Cl. 297—452      3 Claims

ABSTRACT OF THE DISCLOSURE

In an automobile forward seat, the seat back is provided with a shell arrangement for shock absorbing. The shell arrangement is secured along at least a part of the frame in such a manner that the hollow shell space is so disposed as to receive a possible impact. The shell arrangement will withstand a normal load on the seat back but collapses when the seat back frame is subjected to a large impact so as to provide an absorption of the shock of the impact.

BACKGROUND OF THE INVENTION

The present invention relates to an energy shock absorbing seat suitable for motor vehicles, i.e., automobiles, more particularly the front or forward seat of the vehicle.

An automobile seat besides its essential function as a seat i.e., remaining in a sitting position, must sufficiently withstand the forces caused by driving or by impact caused by a collision, and therefore the frame of the seat must have fairly high strength and rigidity.

On the one hand, on the occasion of either a head-on collision or of a sudden stop, there is the danger that the head or knees of the occupant of the rear seat violently hits against the frame of the seat back and might receive a serious injury.

As a countermeasure, a foam material such as sponge rubber, semi-hard urethane foam, etc., or a pad material such as cotton, felt, etc., has hitherto been wound on or caused to adhere to the frame of the seat back to absorb the impact.

Recently, with faster vehicles and the large increase in traffic accidents, there has been a demand for improving the shock absorbing function of the rear side of the seat back. But in order to meet this requirement by the conventional padding material, the thickness of the padding materials must be greatly increased. This means that the effective room space for passengers in the car is decreased and the external appearance of the seat also gets bulky.

SUMMARY OF THE INVENTION

The principal object of the present invention is to provide an improved seat frame capable of providing the basis of a comfortable seat for a passenger or driver and also capable of withstanding shock.

The seat arrangement herein described is attached along at least a part of a back frame for carrying a seat back. There is a shell member disposed in such a manner that the hollow shell space is placed in the direction in which the seat back is subject to a possible impact. The shell member withstands a normal load imposed on the seat back, and collapses when the seat back frame is subject to impact so as to provide an absorption of the shock of the impact.

The shell member advantageously has a C-shaped cross-section with one edge secured to the seat back frame. The shell member may be a sheet hose.

Other objects and advantages of the invention will be apparent from the following description, taken with the accompanying drawings, in which.

DESCRIPTION OF THE PREFERRED EMBODIMENTS

Figure 1:
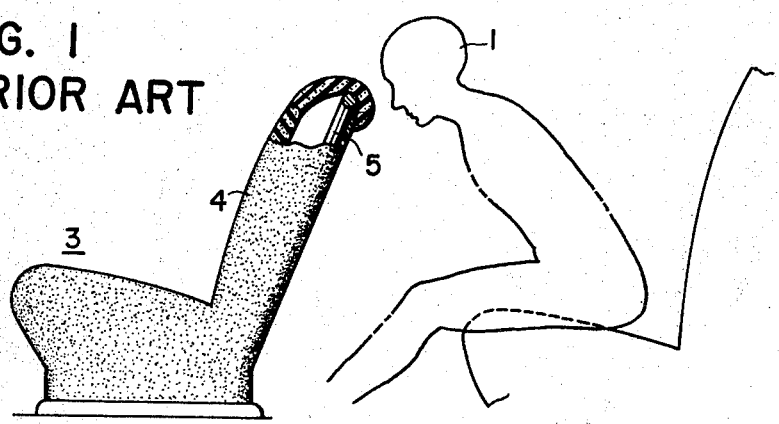
FIGS. 1 and 2 are schematic side views illustrating how a part of the body of the occupant of a rear seat hits against the seat back of the front seat at the time of a vehicle collision or sudden stop in seats of the prior art.
Figure 2:
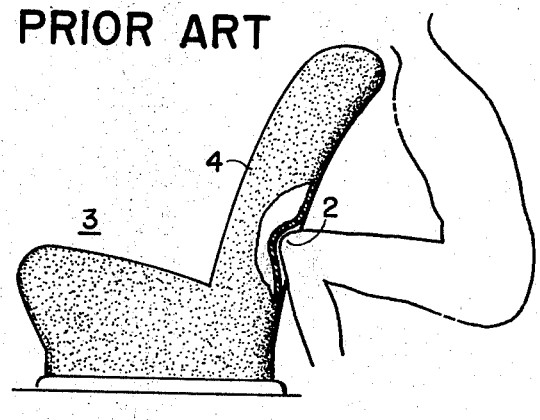
Figure 3:
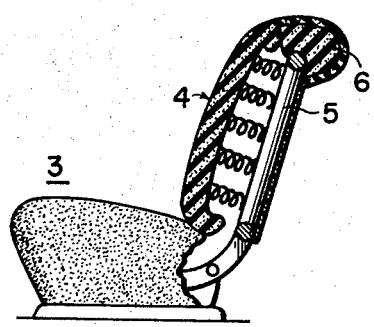
FIG. 3 is a longitudinal side view, partly broken, of the essential part of a conventional seat.

As heretofore mentioned, when there is a sudden impact, there is the danger that the head 1, or knees 2 of the occupant of the rear seat will violently hit against a frame 5 of the back 4 of seat 3 and suffer serious injury as shown in FIGS. 1 and 2. To prevent this, foam material 6 such as sponge rubber is placed on the seat frame 5.

Referring now to FIG. 3 to FIG 7, one edge of a shock absorbing member 7 made of a lazy C-shaped cross-section metal plate is secured by welding so as to direct its arc-like curved surface backward along a frame 5 supporting a seat back 4 of a seat 3. The frame 5 is surrounded with a hollow space of the shock absorbing member 7. A pad layer 8 is attached on the outside of the shock absorbing member. This shock absorbing member 7 is made of a soft steel sheet, etc. and can withstand a load imposed thereon under the usual operating conditions of a vehicle so that there is substantially no deformation of the shock absorbing member. In case a part of the body of the occupant of the rear seat violently hits against the back side of the seat back 4 due to a head-on collision between vehicles, for example, with an impact load of, for example, 80 to 300 kg., shock absorbing member 7 collapses inwardly so that the shock energy is absorbed by plastic deformation and thus the shock is alleviated.

Figure 4:
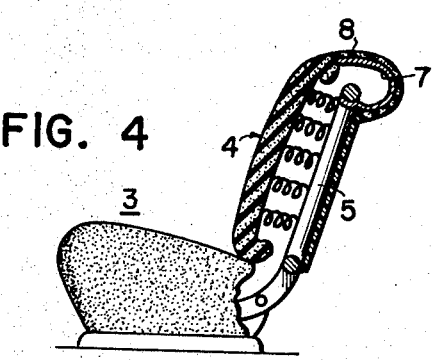
FIG. 4 is a longitudinal side view, partly broken, of the essential part of an embodiment of the present invention.
Figure 5:
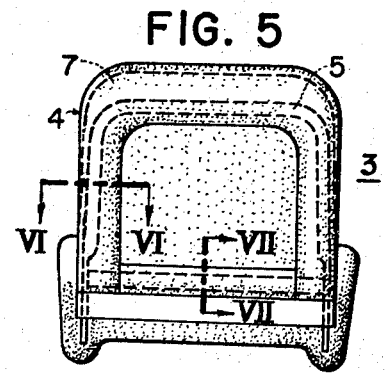
FIG. 5 is a rear view of FIG. 4.
Figure 6:
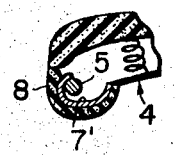
FIG. 6 is a sectional view taken along the line VI—VI of FIG. 5.
Figure 7:
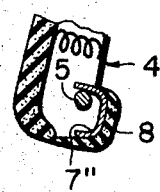
FIG. 7 is a sectional view taken along the line VII—VII of FIG. 5.

As shown in FIG. 4, the absorbing member 7 has a lazy C-shape or almost the start of a spiral configuration, i.e., starting at frame 5, and going upwards and rearward, the curvature of member 7 gradually increases. This is because of the head action shown in FIG. 1. The head 1 tends to hit the top of member 7. This the part which will offer the least resistance to a head impact. This shock absorbing member 7 having a C-shaped cross-section continues around the frame as shown in FIG. 5 offering at the middle of the chair back a shock absorbing, member portion 7' shown in FIG. 6 as well as a lower shock absorbing member portion 7" shown in FIG. 7.

Figure 8:
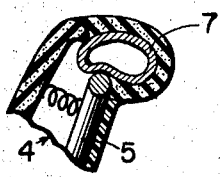
FIG. 8 is a partial side view of another embodiment of the invention concept.

In the arrangement shown in FIG. 8, a shock absorbing member 7 is formed as a hose, and surrounds a part of the peripheral surface on the rear side of the frame 5.

Figure 9:
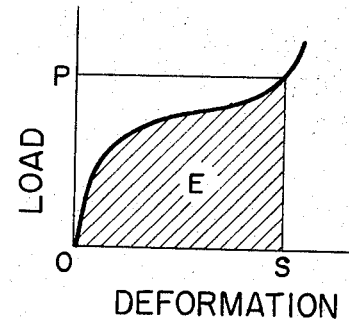
FIG. 9 is a diagram illustrating the shock absorbing efficiency of a normal shock absorbing material.

Now, shock absorbing efficiency $\mu$ is used as a degree showing the shock absorbing performance of shock absorbing materials. This efficiency is indicated by the following equation:

$$\mu = \frac{E}{P \times S}$$

wherein load is represented by P, while deformation is represented with S. The load-deformation curve of shock absorbing materials (pad material, rubber, oil, soft steel plate), is shown in FIG. 9.

In the foregoing equation, E is the energy absorbed due to deformation in kg. per mm., P is the load in kg., while S is in mm.

Figure 10:
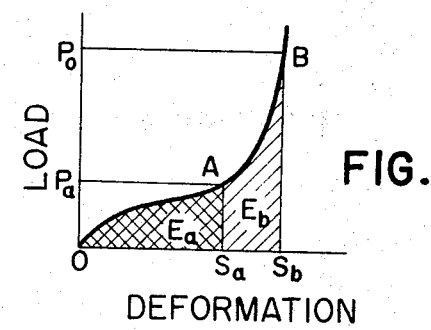
FIG. 10 is a diagram illustrating the shock absorbing efficiency of a shock absorbing member of the seat back of a conventional seat.

FIG. 10 shows a load-deformation curve of a pad material made of a foamed plastic. If this pad material is used in the range $Sa$ in which it deforms up to the point A, by a force $Pa$ producing a shock absorbed energy due to deformation of $Ea$, the shock absorbing efficiency $\mu$ is sufficiently large, while the energy to be absorbed is too small. When the pad material is used, and a force $Po$ is applied causing deformation $Sb$, up to the point B to obtain a larger energy $Eb$ to be absorbed, the shock absorbing efficiency $\mu$ is too small. In this case, $\mu$ is smaller than 0.5.

Figure 11:
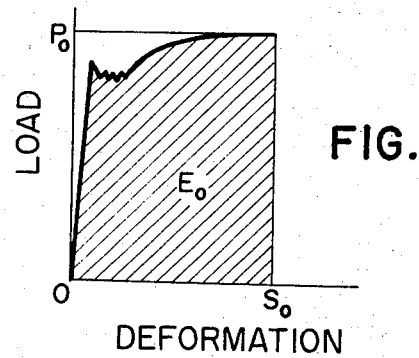
FIG. 11 is a diagram illustrating the shock absorbing efficiency of the shock absorbing member of the seat back seat according to the present invention.

On the contrary, the load-deformation curve of a metal plate such as a soft steel sheet subjected to a load $Po$ is shown in FIG. 11 and the energy to be absorbed $Eo$ in the range of plastic deformation $So$ after yielding is very large as compared with the FIG. 10. Moreover, the energy once absorbed is dissipated in the form of heat energy so that there is little possibility of rebounding. In this case, the shock absorbing efficiency $\mu$ is much bigger than 0.5 and nearly equal to 1.

The seat itself may be of conventional construction, and such seats are disclosed in "SAE Handbook" Supplement TR–135, issued June 1961 or SAE Seating Manual—SAE J782.

The shell member 7 is made of soft steel sheet whose thickness ranges from about 0.6 mm. to about 1.0 mm. The size of this member which has generally a C-shape configuration is from about 20 mm. to about 50 mm. across the short axis and from about 30 mm. to about 80 mm. across the long axis of the C-shape.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. In an automobile, a forward seat having a back frame and cushioning of conventional construction, a crushable shock absorbing portion integral therewith and within the structure of said seat, said shock absorbing portion closed upon itself over at least most of its area and secured to at least part of the frame supporting the seat back so that it is interposed between a rigid portion of the said seat and on the trajectory of a human body striking it in a violent impact and adapted to be crushed by such an impact in a manner transforming kinetic energy of motion into heat.

2. In an automobile forward seat having a back frame, a safety arrangement comprising having the edge of one side of a shock absorbing member having a lazy C-shaped cross-sectional configuration closed on itself secured along at least a part of said back frame in such a manner that the arc-like curved surface of said shock absorbing member is positioned to the rear of the seat and surrounds a part of the peripheral surface of said frame and is spaced from it, the relative position of said shock absorbing member to said frame being maintained against a load placed upon said back frame in the usual state and shock energy is absorbed against a large shock load acting from the rear of the seat from behind by the plastic deformation of said shock absorbing member toward the inside.

3. In an automobile forward seat having a back frame, a shock energy absorbing arrangement comprising having a shock absorbing member formed in a hollow, secured along at least a part of the frame supporting the seat back in such a manner that said shock absorbing member surrounds a part of the peripheral surface on the rear side of the seat back of said frame, and the relative position of said shock absorbing member to said frame is maintained against the load placed upon the seat back in the usual state, while shock energy from a large shock load acting upon the rear side of the seat from behind is absorbed by the plastic deformation of said shock absorbing member toward the inside.

References Cited
UNITED STATES PATENTS

| | | | |
|---|---|---|---|
| 3,206,250 | 9/1965 | Komenda | 297—456 |
| 3,222,698 | 12/1965 | Levenson | 5—361 |

CASMIR A. NUNBERG, Primary Examiner

U.S. Cl. X.R.
297—445, 456, 460